United States Patent
Takahashi et al.

(10) Patent No.: US 10,859,039 B2
(45) Date of Patent: Dec. 8, 2020

(54) CANISTER FOR EVAPORATED FUEL PROCESSING DEVICE

(71) Applicant: AISAN KOGYO KABUSHIKI KAISHA, Obu (JP)

(72) Inventors: Hiroyuki Takahashi, Nagoya (JP); Ryuji Kosugi, Nagoya (JP); Tsutomu Kuniyoshi, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 16/787,384

(22) Filed: Feb. 11, 2020

(65) Prior Publication Data

US 2020/0256287 A1    Aug. 13, 2020

(30) Foreign Application Priority Data

Feb. 12, 2019  (JP) ................. 2019-022903

(51) Int. Cl.
*F02M 25/08*     (2006.01)
*B01D 53/04*     (2006.01)

(52) U.S. Cl.
CPC ..... *F02M 25/0809* (2013.01); *B01D 53/0415* (2013.01); *B01D 53/0446* (2013.01); *F02M 25/0836* (2013.01); *F02M 25/0854* (2013.01); *B01D 2257/708* (2013.01); *B01D 2259/40086* (2013.01); *B01D 2259/4516* (2013.01)

(58) Field of Classification Search
CPC .. B01D 2259/40086; B01D 2259/4516; F02M 25/0809; F02M 25/0836; F02M 25/0854
USPC ............................................... 123/519
See application file for complete search history.

(56) References Cited

U.S. PATENT DOCUMENTS

| | | | | |
|---|---|---|---|---|
| 5,487,369 A * | 1/1996 | Hara | ................ | F02M 25/0854 123/198 D |
| 7,008,470 B2 * | 3/2006 | Makino | ................ | B01D 53/02 123/519 |
| 9,777,679 B2 | 10/2017 | Shimokawa | | |
| 2006/0207577 A1 * | 9/2006 | Loevenbruck | ..... | F02M 25/0836 123/520 |
| 2006/0249126 A1 * | 11/2006 | Hurley | ............. | F02M 25/0836 123/520 |
| 2007/0227361 A1 * | 10/2007 | Kasuya | ............ | B01D 53/0415 96/135 |

(Continued)

FOREIGN PATENT DOCUMENTS

| | | |
|---|---|---|
| JP | H7-238874 A | 9/1995 |
| JP | H9-203353 A | 8/1997 |
| JP | 6128074 B2 | 5/2017 |

*Primary Examiner* — Erick R Solis
(74) *Attorney, Agent, or Firm* — Shumaker, Loop & Kendrick, LLP

(57) ABSTRACT

A canister for an evaporated fuel processing device is proposed, and the canister may include: a casing including an atmospheric port, a tank port, and a purge port; a first adsorbent housed in the casing, facing the atmospheric port; a second adsorbent housed in the casing and facing the tank port and the purge port, and separated from the first adsorbent by a space; a second passage communicating the atmospheric port and the space and bypassing a first passage which extends from the atmospheric port through the first adsorbent to the space; and a switching valve configured to switch opening and closing of the second passage.

6 Claims, 9 Drawing Sheets

(56) References Cited

U.S. PATENT DOCUMENTS

2020/0158037 A1\* 5/2020 Shinagawa ........... F02D 41/003

\* cited by examiner

CANISTER FOR EVAPORATED FUEL PROCESSING DEVICE

CROSS-REFERENCE TO RELATED APPLICATION

This application claims priority to Japanese Patent Application No. 2019-022903, filed on Feb. 12, 2019, the entire contents of which are incorporated herein by reference.

TECHNICAL FIELD

The present specification discloses a technique relating to a canister for an evaporated fuel processing device.

BACKGROUND

Japanese Patent Application Publication No. H7(1995)-238874 (hereinafter referred to as Patent Literature 1) describes a canister used in an evaporative fuel processing device. The canister of Patent Literature 1 contains activated carbon for adsorbing evaporated fuel in a casing. The casing houses therein a main activated carbon layer and a sub-activated carbon layer having a larger flow path resistance than the main activated carbon layer and facing the main activated carbon layer across a space (diffusion suppressing space). The casing is provided with a first atmospheric port, a second atmospheric port, a tank port, and a purge port. The first atmospheric port faces the sub-activated carbon layer on an opposite side of the space relative to the sub-activated carbon layer. The tank port and the purge port face the main activated carbon layer on an opposite side of the space relative to the main activated carbon layer. The second atmospheric port faces an intermediate portion of the main activated carbon layer (between an end of the main activated carbon layer on a lank port (and the purge port) side and an end of the main activated carbon layer on a space side). Specifically, the first atmospheric port, the tank port, and the purge port are provided on one end side of the case, and the second atmospheric port is provided on another end side.

Evaporated fuel generated in a fuel tank is supplied from the tank port into the canister, and discharged from the first atmospheric port through the main activated carbon layer, the space, and the sub-activated carbon layer. At this occasion, the second atmospheric port is closed. Since the evaporated fuel is adsorbed by the main activated carbon layer and the sub-activated carbon layer, gas hardly containing the evaporated fuel is discharged from the first atmospheric port. In Patent Literature 1, when the evaporated fuel is supplied from the canister to an internal combustion engine, first, air is introduced from the first atmospheric port, and gas containing the evaporated fuel (purge gas) is supplied from the purge port to the internal combustion engine while desorbing the evaporated fuel adsorbed on the sub-activated carbon layer. At this occasion, the second atmospheric port is closed. Thereafter, the second atmospheric port is opened, air is introduced from the second atmospheric port, and the purge gas is supplied to the internal combustion engine while desorbing the evaporated fuel adsorbed on the main activated carbon layer.

SUMMARY

As described above, in the canister of Patent Literature 1, air (outside air) is introduced from the first atmospheric port at an initial stage of the supply of the purge gas, and the evaporated fuel adsorbed on the sub-activated carbon layer is desorbed. Therefore, when the evaporated fuel is introduced into the canister next time, the sub-activated carbon layer has sufficient adsorption capability, and can prevent the evaporated fuel from being discharged to atmosphere. Further, after the evaporated fuel adsorbed on the sub-activated carbon layer is desorbed, air is introduced from the second atmospheric port to supply the purge gas. Due to this, the air passes through the main activated carbon layer having a small flow path resistance, and is discharged from the purge port while desorbing the evaporated fuel from the main activated carbon layer. Therefore, a large purge flow rate can be ensured.

However, as described above, the second atmospheric port faces the intermediate portion of the main activated carbon layer. In other words, a part of the main activated carbon layer is intervened between the space (the space between the main activated carbon layer and the sub-activated carbon layer) and the second atmospheric port. Since the air introduced from the second atmospheric port moves in the main activated carbon layer toward the purge port, it is difficult for the air to flow through the part of the main activated carbon layer intervened between the space and the second atmospheric port. Therefore, at the part between the space and the second atmospheric port, the evaporated fuel is difficult to be desorbed from the main activated carbon layer, and the evaporated fuel thereby remains in the canister. Further improvement of a canister is demanded in order to reliably discharge evaporated fuel adsorbed in the canister to an internal combustion engine. It is an object of the present specification to provide a canister having an improved efficiency of discharging evaporated fuel.

A first technique disclosed herein is a canister for an evaporated fuel processing device. The canister may comprise: a casing including an atmospheric port, a tank port, and a purge port; a first adsorbent housed in the casing and facing the atmospheric port; a second adsorbent housed in the casing, facing the tank port and the purge port, and separated from the first adsorbent by a space; a second passage communicating the atmospheric port and the space and bypassing a first passage which extends from the atmospheric port through the first adsorbent to the space; and a switching valve configured to switch between opening and closing of the second passage.

A second technique disclosed herein is the canister of the first technique which may further comprise a failure detector connected to the atmospheric port, wherein the second passage may bypass the first passage and the failure detector.

A third technique disclosed herein is the canister of the first or second technique, which may further comprise a third adsorbent disposed at a position in the space that is away from the first adsorbent and the second adsorbent, wherein the second passage may communicate with the space between the first adsorbent and the third adsorbent.

A fourth technique disclosed herein is the canister according to any one of the above-mentioned first to third techniques, which may further comprise a sensor configured to detect a state of the first adsorbent, wherein the switching valve may switch between opening and closing of the second passage based on a detected value of the sensor.

According to the first technique, by closing the second passage (setting the second passage in a non-conducted state) when the purge gas is supplied to the internal combustion engine, the air introduced from the atmospheric port passes through the first adsorbent, the space, and the second adsorbent to reach the purge port. In an initial stage of the purging, the evaporated fuel adsorbed on the first adsorbent can be desorbed, and the first adsorbent can be brought into a state in which the first adsorbent does not have the evaporated fuel adsorbed thereon. Therefore, when the evaporated fuel is introduced into the canister next time, the evaporated fuel can be reliably adsorbed by the first adsorbent, and the evaporated fuel can be prevented from being discharged to outside air. Further, by opening the second passage (setting the second passage in a conducted state) at the time of purging after the evaporated fuel has been desorbed from the first adsorbent, the air introduced from the atmospheric port passes through the second adsorbent without passing through the first adsorbent, and reaches the purge port. The flow path resistance of air (purge gas including fuel gas) in the canister is reduced, and a large amount of purge gas can be supplied to the internal combustion engine. In the first technique, the second passage communicates the space (space portion between the first adsorbent and the second adsorbent) and the atmospheric port. Therefore, the air that has bypassed the first adsorbent is supplied to the second adsorbent from one end (on a space side) of the second adsorbent, and is discharged from another end (on a purge port side) of the second adsorbent. That is, the air passes through an entirety of the second adsorbent. As a result, the evaporated fuel is less likely to remain in the second adsorbent, and the evaporated fuel adsorbed in the canister can be efficiently supplied to the internal combustion engine.

According to the first technique, the resistance in the canister (the flow path resistance of the passage from the tank port to the atmosphere port) can be reduced by opening the second passage when refueling the fuel tank. Since the increase in the pressure in the canister is suppressed, the evaporated fuel generated at the time of refueling easily moves into the canister, and the evaporated fuel generated at the time of refueling can be suppressed from being discharged to the atmosphere.

According to the second technique, detection of failure of the canister (e.g. leakage, presence or absence of a failure of the switching valve) can be performed without impairing advantages of the first technique described above. For example, in a case where a means for sending the air in the canister to outside, such as a pump, is connected to the atmospheric port, when the pump is operated in a state where the second passage and the purge port are closed, the pressure in the canister decreases so long as no abnormality is occurring in the canister. On the other hand, if an abnormality such as leakage is occurring in the canister, or if an abnormality is occurring in the switching valve (the second passage is not closed), the pressure in the canister does not decrease. When the second passage is opened in a state where the pump is operated after confirming that the pressure in the canister has decreased normally, the pressure in the canister increases to almost the atmospheric pressure so long as the switching valve is normally operating (the second passage changes from a closed state to an opened state). By detecting the pressure change in the canister as described above, it is possible to detect a failure of the canister (diagnose of presence/absence of failure). That is, the pump can be used as a failure detector. When a pump is used as the failure detector, the pump may be connected to the atmospheric port so as to feed air into the canister. In this case, so long as no abnormality is occurring in the canister, the pressure in the canister increases when the second passage is closed, and the pressure in the canister decreases to substantially the atmospheric pressure when the second passage is opened.

According to the third technique, it is possible to further suppress emission of the evaporated fuel to the atmosphere. Generally, the evaporated fuel adsorbed by the second adsorbent diffuses into the space as time advances, and thereafter, the evaporated fuel that has diffused into the space is adsorbed by the first adsorbent. However, according to the third technique, the evaporated fuel diffused from the second adsorbent into the space does not move as it is to the first adsorbent, is adsorbed by the third adsorbent temporarily, diffuses again from the third adsorbent into the space, and then is adsorbed by the first adsorbent. Therefore, the amount of the evaporated fuel moving to the first adsorbent is reduced, and the emission of the evaporated fuel to the atmosphere is further suppressed. Further, since the amount of evaporated fuel adsorbed by the first adsorbent is reduced, it is possible to shorten a time during which the air passes through the first adsorbent (i.e., time during which the purge gas is supplied in a state where the flow path resistance is large) when the purge gas is supplied to the internal combustion engine. Even by simply increasing the amount of the second adsorbent, the amount of evaporated fuel moving to the first adsorbent can be reduced. However, if the amount of the second adsorbent is increased, the flow path resistance in the canister when the purge gas is supplied increases correspondingly to that increase. As in the third technique, by disposing the third adsorbent in the space between the first adsorbent and the second adsorbent at a position away from both the first adsorbent and the second adsorbent, it is possible to further suppress the emission of the evaporated fuel to the atmosphere while suppressing the increase of the flow path resistance in the canister.

According to the fourth technique, the opening and closing of the second passage can be switched at an appropriate timing. A speed at which the evaporated fuel is desorbed from the first adsorbent varies depending on the temperatures of the first adsorbent and the introduced air, and an adsorption amount of the evaporated fuel onto the first adsorbent. Therefore, a desorption state of the evaporated fuel from the first adsorbent can be accurately detected by detecting the state of the first adsorbent caused by the adsorption amount of the evaporated fuel, such as the temperature of the first adsorbent, a capacitance of the first adsorbent, and an oxygen concentration in the first adsorbent, for example, and the flow path can be switched to the second passage quickly after the evaporated fuel is desorbed from the first adsorbent. It is possible to secure a period during which the purge gas is supplied in a state in which the flow path resistance in the canister is low long.

DETAILED DESCRIPTION

First Embodiment: Structure of Canister

A canister 100 will be described with reference to FIG. 1. The canister 100 is mounted on a vehicle such as an automobile. The canister 100 is used as a part of an evaporated fuel processing device configured to adsorb evaporated fuel generated in a fuel tank (not shown) to prevent the evaporated fuel from being discharged to the atmosphere, and to process (combust) the adsorbed evaporated fuel in an internal combustion engine.

Figure 1:
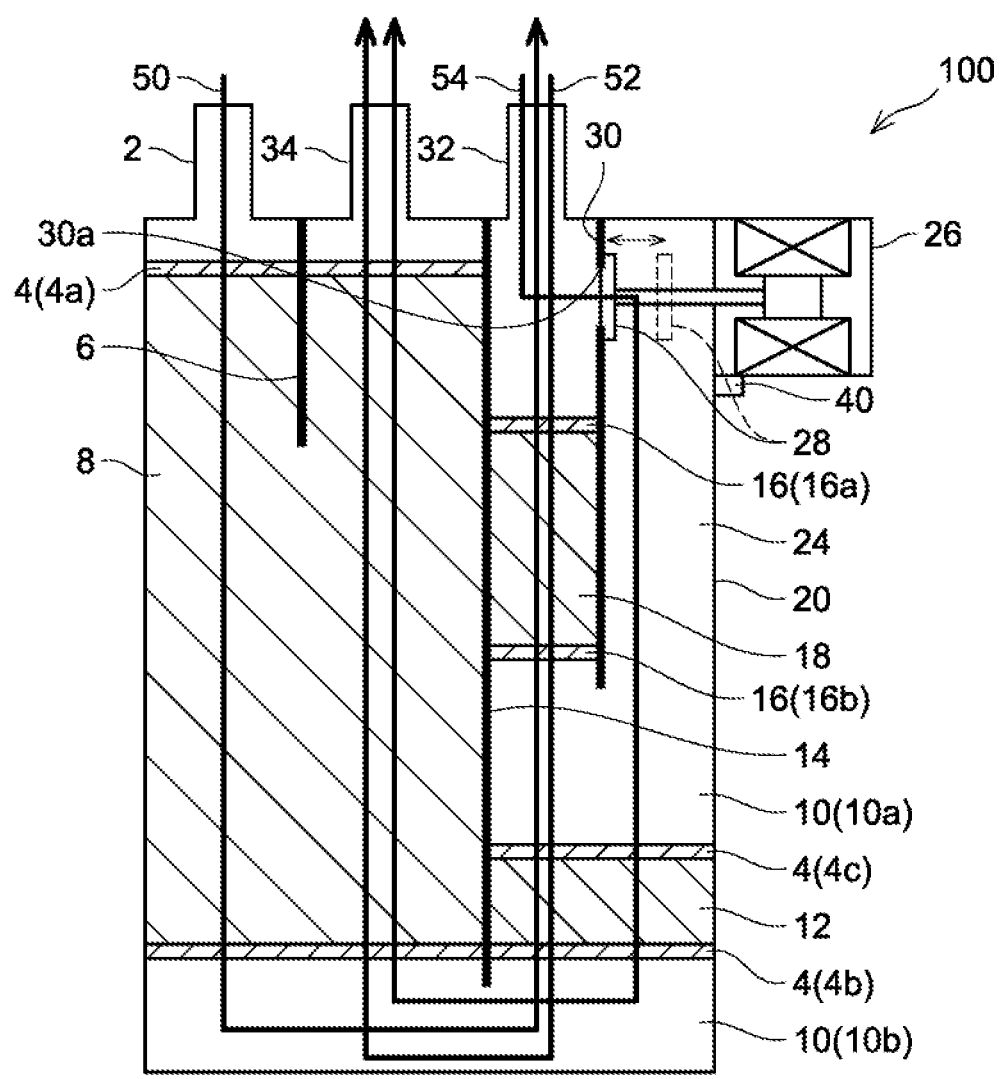
FIG. 1 shows a cross-sectional view of a canister of a first embodiment.

As shown in FIG. 1, the canister 100 comprises a casing 20, and three ports (a tank port 2, an atmospheric port 32, and a purge port 34). The ports 2, 32, and 34 are arranged substantially in a line on one end surface of the casing 20. In the following description, for convenience, the one end surface (one side) on which the ports 2, 32, and 34 are provided may be referred to as an upper end surface (upper side) of the casing 20, and another end surface (another side) opposite to the upper end surface (upper side) may be referred to as a lower end surface (lower side). A first activated carbon 18, a second activated carbon 8, and a third activated carbon 12 are accommodated in the casing 20. An electric-operated valve 26 configured to change a gas flow path in the casing 20 and a sensor 40 configured to detect a capacitance of the first activated carbon 18 are provided outside the casing 20. The electric-operated valve 26 and the sensor 40 are fixed to a side surface of the casing 20 (surface connecting the upper end surface and the other end surface). The activated carbons 8, 12, 18 are each an example of an adsorbent, and the electric-operated valve 26 is an example of a switching valve. The first activated carbon 18 corresponds to a first adsorbent, the second activated carbon 8 corresponds to a second adsorbent, and the third activated carbon 12 corresponds to a third adsorbent.

An inside of the casing 20 is roughly divided into two spaces by a first partition wall 14. The first partition wall 14 is fixed to the upper end surface of the casing 20 at a point between the atmospheric port 32 and the purge port 34, and extends toward the lower end surface of the casing 20. However, the first partition wall 14 is not fixed to the lower end surface of the casing 20. Therefore, the atmospheric port 32 and the purge port 34 (and the tank port 2) communicate with each other on a lower side of the casing 20. That is, the air introduced from the atmospheric port 32 can move from an upper side to the lower side of the casing 20, passes over the first partition wall 14, moves from the lower side to the upper side of the casing 20, and reach the purge port 34. When the air moves from the atmospheric port 32 to the purge port 34, the evaporated fuel adsorbed on the activated carbons 8, 12, 18 is desorbed, and a mixed gas (purge gas) is generated. The generated purge gas is supplied from the purge port 34 to an intake system (not shown) of the internal combustion engine.

Similarly, the evaporated fuel introduced from the tank port 2 can move from the upper side to the lower side of the casing 20, pass over the first partition wall 14, move from the lower side to the upper side of the casing 20, and reach the atmospheric port 32. The evaporated fuel is adsorbed by the activated carbons 8, 12, 18 while moving from the tank port 2 to the atmospheric port 32. The gas from which the evaporated fuel has been removed is discharged to the atmosphere through the atmospheric port 32.

The first activated carbon 18 is accommodated in the casing 20 at a position facing the atmospheric port 32. Specifically, the first activated carbon 18 is disposed between the first partition wall 14 and a second partition wall 30. The second partition wall 30 is fixed to the upper end surface of the casing 20 between the atmospheric port 32 and a side wall of the casing 20, and extends toward the lower end surface of the casing 20. Due to this, the air introduced from the atmospheric port 32 and the gas discharged from the atmospheric port 32 usually pass through the first activated carbon 18 disposed between the first partition wall 14 and the second partition wall 30.

A length of the second partition wall 30 (length in a vertical direction) is shorter than a length 30 of the first partition wall 14. Therefore, below the second partition wall 30 (below the first activated carbon 18), a space 10 (first space portion 10a) surrounded by the first partition wall 14 and the side wall of the casing 20 is formed. The third activated carbon 12 is disposed in the space 10. The space 10 is divided into the first space portion 10a and a second space portion 10b by the third activated carbon 12. In other words, the third activated carbon 12 is disposed at a position apart from both the first activated carbon 18 and the second activated carbon 8 in the space 10 which separates the first activated carbon 18 and the second activated carbon 8. In addition, although details will be described later, the second partition wall 30 has an opening 30a, and the opening 30a is closed by a valve body 28 of the electric-operated valve 26. By operating the electric-operated valve 26 to open and close the opening 30a, the gas flow path in the casing 20 can be changed (switched).

The second activated carbon 8 is accommodated in the casing 20 at a position facing the tank port 2 and the purge port 34. Specifically, the second activated carbon 8 is disposed between the first partition wall 14 and the side wall of the casing 20 on the opposite side of the first partition wall 14 with respect to the first activated carbon 18 and the third activated carbon 12. The second activated carbon 8 is separated from the third activated carbon 12 by the second space portion 10b. Since the third activated carbon 12 is disposed in the space 10, it can be said that the second activated carbon 8 is separated from the first activated carbon 18 by the space 10.

In the canister 100, a third partition wall 6 fixed to the upper end surface of the casing 20 between the tank port 2 and the purge port 34 extends toward the lower end surface of the casing 20. A length of the third partition wall 6 (length in the vertical direction) is shorter than the lengths of the first partition wall 14 and the second partition wall 30. A lower end of the third partition wall 6 is located in the second activated carbon 8. The third partition wall 6 prevents direct communication of the tank port 2 and the purge port 34, that is, prevents the evaporated fuel introduced from the tank port 2 from being discharged from the purge port 34 without passing through the second activated carbon 8.

In the canister 100, the first activated carbon 18 is disposed between a pair of filters 16 (16a, 16b), the second activated carbon 8 is disposed between a pair of filters 4 (4a,4b), and the third activated carbon 12 is disposed between a pair of filters 4 (4c,4b). A shared filer 4b is arranged below the second activated carbon 8 and below the third activated carbon 12. The filters 4 and 16 remove foreign matters from the gas introduced into the casing 20 and prevent the activated carbons 8, 12, and 18 from moving in the casing 20.

As described above, the sensor 40 detects the capacitance of the first activated carbon 18. The capacitance of the first activated carbon 18 varies depending on an adsorption amount (adsorption rate) of the evaporated fuel on the first activated carbon 18. That is, the sensor 40 detects a state of the first activated carbon 18 caused by the adsorption amount of the evaporated fuel on the first activated carbon 18. The sensor 40 includes a pair of electrodes (not shown) embedded in the first activated carbon 18, and by measuring the capacitance between the pair of electrodes, the adsorption amount (adsorption rate) of the evaporated fuel on the first activated carbon 18 can be detected.

(Gas Flow Path in Canister)

As described above, the canister 100 adsorbs the evaporated fuel generated in the fuel tank to prevent the evaporated fuel from being discharged to the atmosphere, and supplies the adsorbed evaporated fuel to the internal combustion engine to process (combust) the same. The evaporated fuel (gas containing evaporated fuel) generated in the fuel tank is introduced into the casing 20 from the tank port 2 connected to the fuel tank, passes through the second activated carbon 8, the space 10 (the second space portion 10*b*, the third activated carbon 12, the first space portion 10*a*), and the first activated carbon 18 in this order, and is discharged to the atmosphere from the atmospheric port 32, as indicated by an arrow 50.

The evaporated fuel introduced into the casing 20 is firstly adsorbed on the second activated carbon 8. Thereafter, the evaporated fuel diffused from the second activated carbon 8 into the second space portion 10*b* is adsorbed onto the third activated carbon 12. Further, the evaporated fuel diffused from the third activated carbon 12 into the first space portion 10*a* is adsorbed on the first activated carbon 18. Therefore, generally, the adsorption rate of the evaporated fuel in the first activated carbon 18 is lower than the adsorption rate of the evaporated fuel in the third activated carbon 12, and the adsorption rate of the evaporated fuel in the third activated carbon 12 is lower than the adsorption rate of the evaporated fuel in the second activated carbon 8. Further, the first activated carbon 18 is disposed between the first partition wall 14 and the second partition wall 30. Therefore, a channel width of the first activated carbon 18 is narrower than channel widths of the second activated carbon 8 and the third activated carbon 12. In other words, movement resistance of the gas in the first activated carbon 18 (gas containing the air and the evaporated fuel) is larger than a movement resistance of the gas in the second activated carbon 8 and the third activated carbon 12.

The canister 100 arranges the plurality of activated carbons 8, 12, and 18 separated by the space portions 10*a* and 10*b* in the flow path (arrow 50) of the evaporated fuel, and thus the amount of the evaporated fuel discharged to the atmosphere can be made extremely small (almost zero).

In the canister 100, when the purge gas is supplied to the internal combustion engine, as shown by an arrow 52, air introduced into the casing 20 from the atmospheric port 32 passes through the first activated carbon 18, the space 10 (the first space 10*a*, the third activated carbon 12, the second space 10*b*), and the second activated carbon 8 in this order, and is discharged to the internal combustion engine from the purge port 34. When the air moves from the atmospheric port 32 to the purge port 34, the evaporated fuel is desorbed from the first activated carbon 18, the third activated carbon 12, and the second activated carbon 8, and is discharged to the internal combustion engine as a gas containing the evaporated fuel. At this occasion, the gas passes through a region from one ends to the other ends of all of the activated carbons 18, 12, and 8 (i.e., entireties of the activated carbons 18, 12, and 8) sequentially from an upstream side (side close to the atmospheric port 32) of the flow path shown by the arrow 52. Therefore, in the canister 100, a situation under which the evaporation fuel remains in a specific range of the activated carbons 18, 12, and 8 is suppressed, and efficiency of discharging the evaporated fuel is high.

As described above, in the canister 100, the second partition wall 30 includes the opening 30*a*, and the opening 30*a* is closed by the valve body 28 of the electric-operated valve 26. The opening 30*a* is provided above the first activated carbon 18 (above a surface of the first activated carbon 18 on an atmospheric port 32 side). Further, the canister 100 includes the sensor 40 configured to detect the capacitance of the first activated carbon 18. Therefore, after it is confirmed by the sensor 40 that the evaporated fuel adsorbed on the first activated carbon 18 has been desorbed, the valve body 28 is moved to a position shown by a broken line to open the opening 30*a*, and a bypass passage 24 that bypasses the first activated carbon 18 can be opened. That is, the atmospheric port 32 communicates with the space 10 through the bypass passage 24, and the air introduced from the atmospheric port 32 can move to the third activated carbon 12 without passing through the first activated carbon 18. The bypass passage 24 is an example of a second passage.

When the bypass passage 24 is opened, the air introduced from the atmospheric port 32 passes through the third activated carbon 12 and the second activated carbon 8 and is discharged from the purge port 34 as indicated by an arrow 54, without passing through the first activated carbon 18. Therefore, after the bypass passage 24 is opened (after the evaporated fuel adsorbed on the first activated carbon 18 is desorbed), the flow path resistance of the gas moving in the casing 20 becomes small, and a large amount of the purge gas can be supplied to the internal combustion engine. Further, in the canister 100, the bypass passage 24 can be opened at time of refueling. Due to this, a pressure rise in the canister 100 is suppressed, making it easy for the evaporated fuel generated at the time of refueling to be introduced into the canister 100. The evaporated fuel introduced into the canister 100 at the time of refueling is adsorbed by the second activated carbon 8 (or the third activated carbon 12).

In the canister 100, a solenoid valve is used as the electric-operated valve 26. That is, usually (when the electric-operated valve 26 is not operated), the valve body 28 closes the opening 30*a* by biasing force of a spring, while when the electric-operated valve 26 (coil of the electric-operated valve 26) is energized and the electric-operated valve 26 is operated, the valve body 28 separates from the opening 30*a* and opens the bypass passage 24. For example, while the vehicle is stopped, the opening 30*a* is closed, and the bypass passage 24 is closed. Therefore, the evaporated fuel (gas containing the evaporated fuel) generated in the fuel tank during when the vehicle is stopped does not pass through the bypass passage 24, but passes through the second activated carbon 8, the space 10 (the second space portion 10*b*, the third activated carbon 12, the first space portion 10*a*), and the first activated carbon 18, as indicated by the arrow 50. Since the gas passes through the first activated carbon 18 having the large flow path resistance, the gas discharged to the atmosphere contains almost no evaporated fuel.

Second to Sixth Embodiments

Hereinafter, referring to FIGS. 2 to 6, a canister 200 (second embodiment), a canister 300 (third embodiment), a canister 400 (fourth embodiment), a canister 500 (fifth embodiment), and a canister 600 (sixth embodiment) will be described. Each of the canisters 200 to 600 is a variant of the canister 100. The canisters 200 to 600 have substantially the same configuration as the canister 100, and the same reference numerals or same lower two digits may be given to identical features in the canisters 200 to 600 to those of the canister 100, so that the description thereof may be omitted.

Second Embodiment

Figure 2:
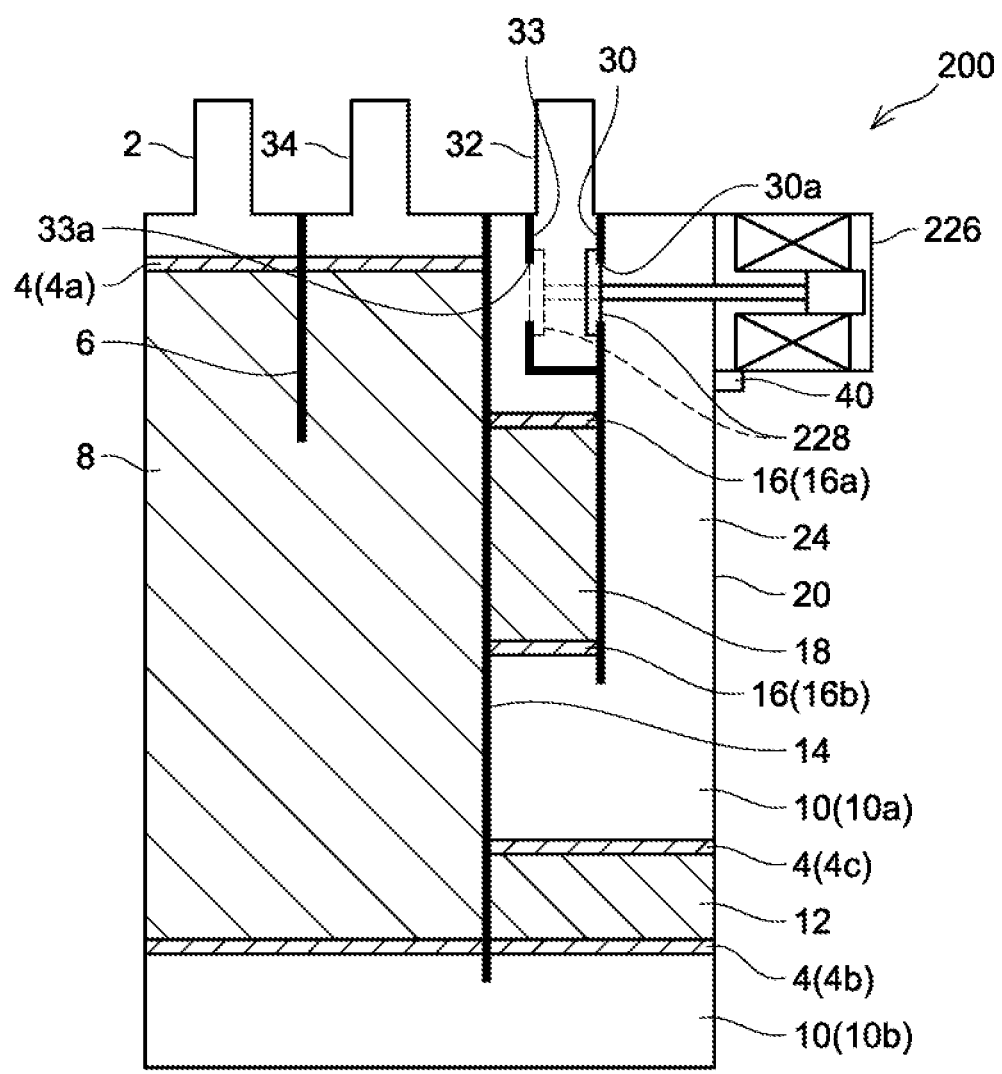
FIG. 2 shows a cross-sectional view of a canister of a second embodiment.

The canister 200 shown in FIG. 2 includes a fourth partition wall 33, one end of which is fixed to the upper end surface of the casing 20 between the atmospheric port 32 and the first partition wall 14, and another end of which is fixed to the second partition wall 30. The fourth partition wall 33 includes an opening 33a. In the canister 200, in an electric-operated valve 226, normally (when the electric-operated valve 226 is not operated), a valve body 228 closes the opening 30a by biasing force of a spring, the electric-operated valve 226 (coil of the electric-operated valve 226) is energized, while when the electric-operated valve 226 is operated, the valve body 228 separates from the opening 30a and closes the opening 33a. That is, when the electric-operated valve 226 is not operated, a first passage extending from the atmospheric port 32 to the space 10 (first space portion 10a) through the first activated carbon 18 is selected. On the other hand, when the electric-operated valve 226 is operated, a bypass passage (second passage) 24 extending from the atmospheric port 32 to the space 10 (first space portion 10a) without passing through the first activated carbon 18 is selected. The electric-operated valve 226 has a structure in which the valve body 228 moves to the inside of the casing 20 (fourth partition wall 33 side) when the electric-operated valve 226 is operated. In the canister 200, when the bypass passage 24 is opened, the flow path extending from the atmospheric port 32 to the first activated carbon 18 is completely closed. Therefore, the air introduced from the atmospheric port 32 can be introduced into the bypass passage 24 without contacting the first activated carbon 18. It can be said that the second partition wall 30, the fourth partition wall 33, and the electric-operated valve 226 constitute a three-way valve.

Third Embodiment

Figure 3:
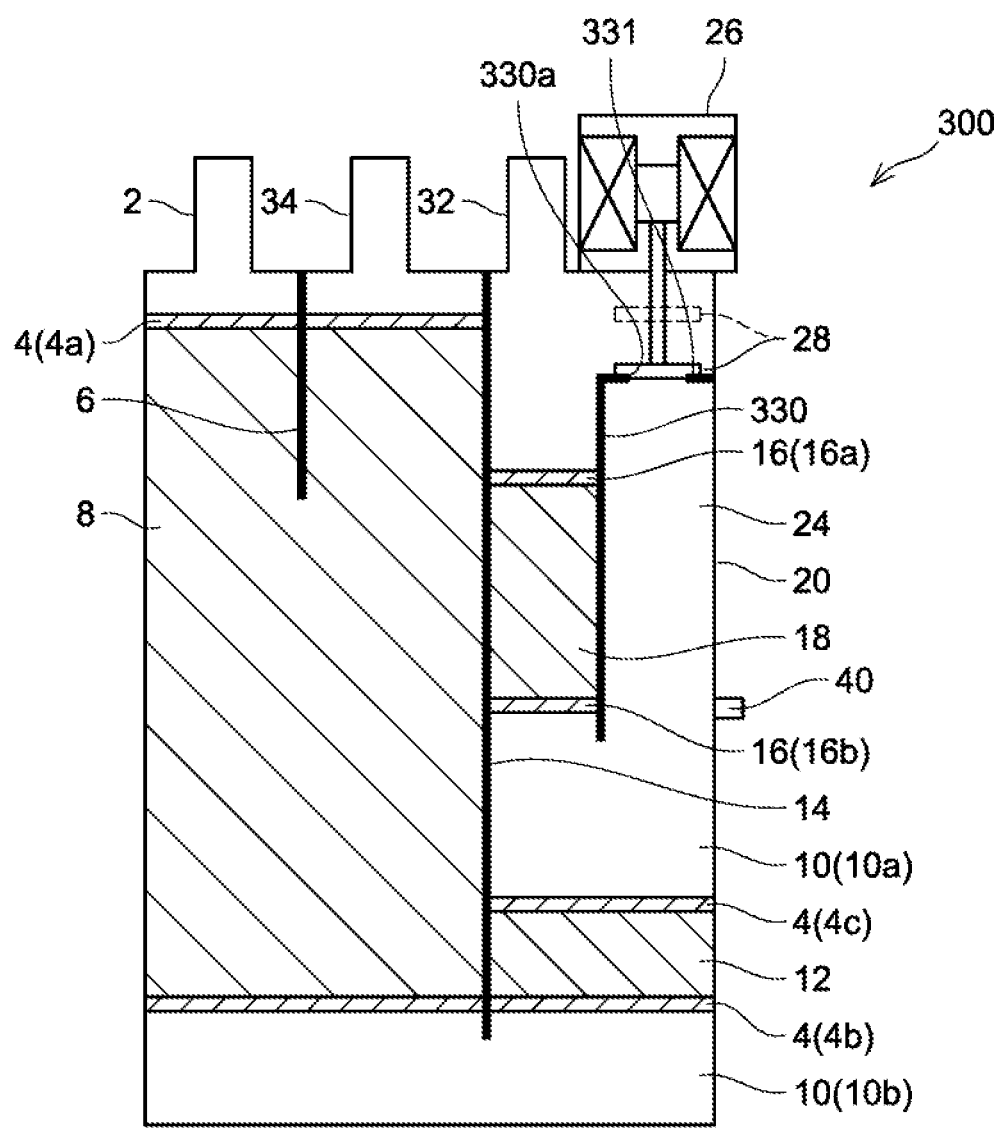
FIG. 3 shows a cross-sectional view of a canister of a third embodiment.

In the canister 300 shown in FIG. 3, an electric-operated valve 26 is disposed above the casing 20 in parallel with the ports 2, 32, and 34. In the canister 300, an opening 330a is defined at an upper end of a second partition wall 330, and a seating surface 331 is formed at the opening 330a. Normally (when the electric-operated valve 26 is not operated), in the electric-operated valve 26, the valve body 28 is in contact with the seating surface 331 by biasing force of a spring to close the opening 330a, and when the electric-operated valve 26 is operated, the valve body 28 separates from the seating surface 331 to open the bypass passage 24. The canister 300 can reduce an entire size of the canister by arranging the electric-operated valve 26 above the casing 20.

Fourth Embodiment

Figure 4:
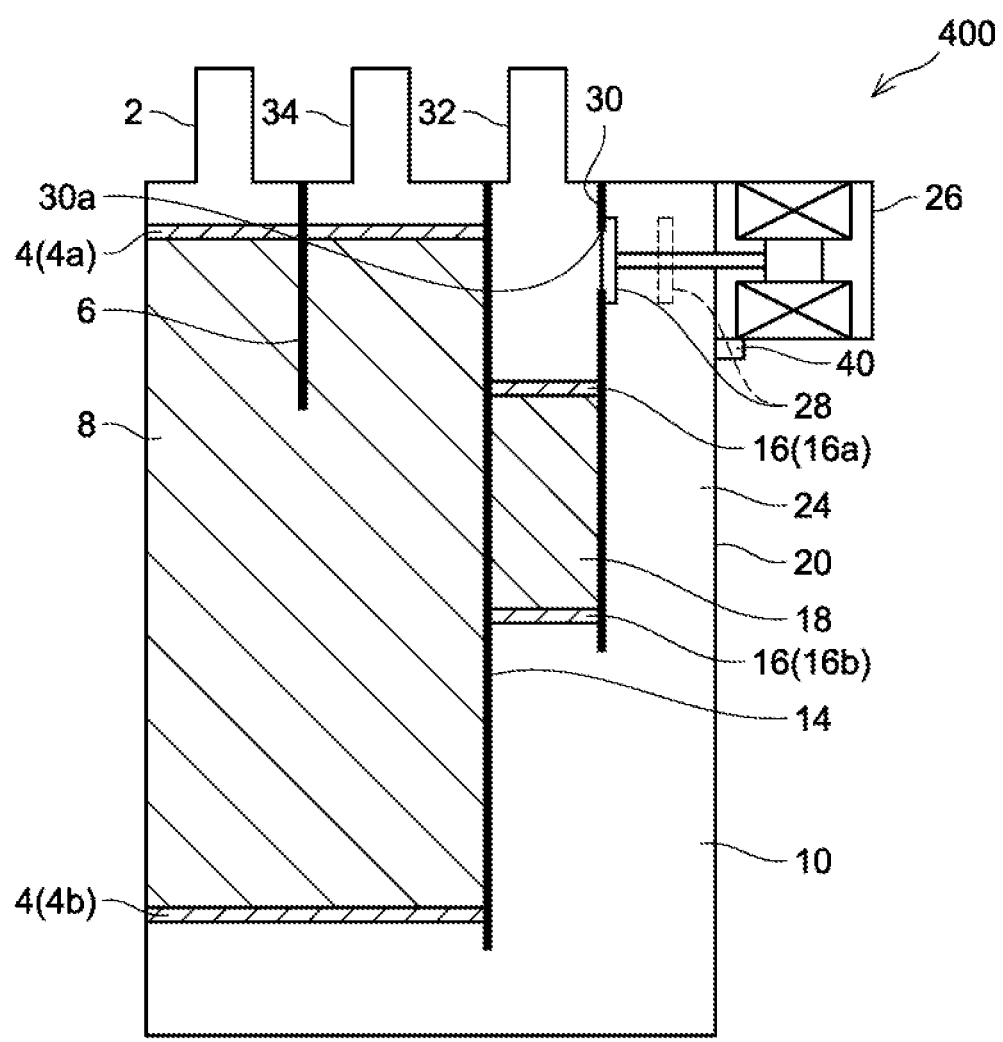
FIG. 4 shows a cross-sectional view of a canister of a fourth embodiment.

A canister 400 shown in FIG. 4 is the same as the canister 100 except that the canister 400 does not comprise the third activated carbon 12. Even in such a configuration, after the evaporated fuel adsorbed on the first activated carbon 18 is desorbed, the purge gas can be supplied to the internal combustion engine through the bypass passage 24 having a small flow path resistance. In addition, the canister 400 can also open the bypass passage 24 at the time of refueling, and can suppress an increase in pressure in the canister 100 at the time of refueling.

Fifth Embodiment

Figure 5:
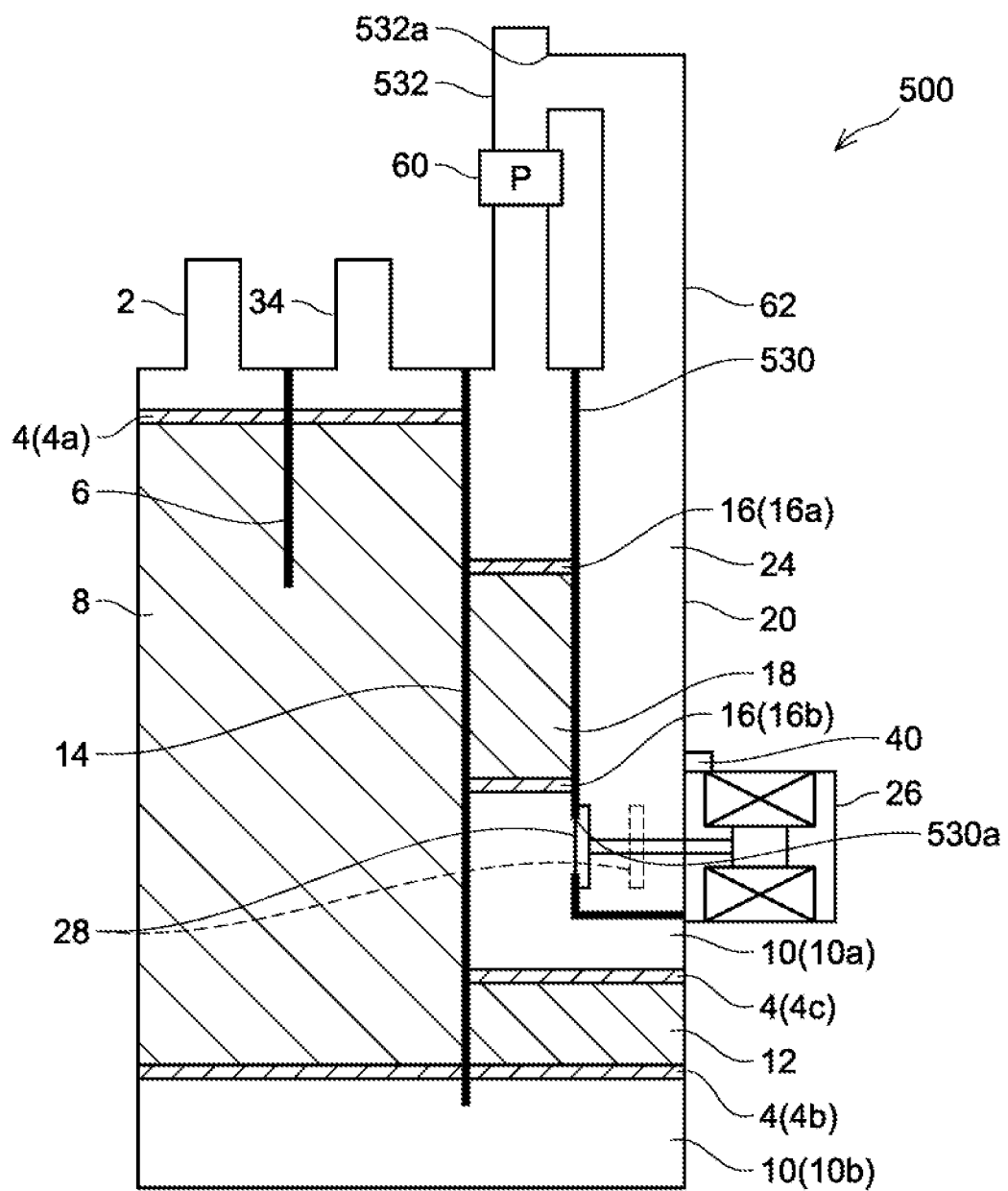
FIG. 5 shows a cross-sectional view of a canister of a fifth embodiment.

In a canister 500 shown in FIG. 5, a second partition wall 530 is fixed to the upper end surface of the casing 20 between an atmospheric port 532 and the side wall of the casing 20, and extends toward the lower end surface of the casing 20. The second partition wall 530 is fixed to the side wall of the casing 20 below the first activated carbon 18 (which is lower than the surface of the first activated carbon 18 opposite to the atmospheric port 532). The second partition wall 530 is provided with an opening 530a below the first activated carbon 18. A pump 60 is connected to an intermediate part of the atmospheric port 532. Further, an opening 532a is provided between a tip of the atmospheric port 532 and the pump 60, and a pipe 62 is connected between the opening 532a and and a gap between the second partition wall 530 and the side wall of the casing 20. The pump 60 is an example of a failure detector.

In the canister 500, when the electric-operated valve 26 closes the opening 530a of the second partition wall 530, the air introduced from the atmospheric port 532 moves through a first passage that passes through the first activated carbon 18 and reaches the space 10. On the other hand, when the electric-operated valve 26 opens the opening 530a of the second partition wall 530, the air introduced from the atmospheric port 532 passes through the pipe 62, the gap between the second partition wall 530 and the side wall of the casing 20, and reaches the space 10. That is, in the canister 500, a bypass passage 24 is formed by the pipe 62, the gap between the second partition wall 530 and the side wall of the casing 20. After the evaporated fuel adsorbed on the first activated carbon 18 is desorbed, the canister 500 can also supply the purge gas to the internal combustion engine through the bypass passage 24 having a small flow path resistance. In addition, the bypass passage 24 can be opened at the time of refueling, and an increase in pressure in the canister 500 at the time of refueling can be suppressed.

Further, the canister 500 can lower the pressure in the canister 500 by driving the pump 60. For example, when the pump 60 is operated in a state in which the purge port 34 is closed (in actuality, a valve disposed between the purge port 34 and the intake system is closed) and the opening 530a is closed (the bypass passage 24 is closed), the pressure in the casing 20 is lowered. On the other hand, even if the pump 60 is operated in a state in which the opening 530a is opened (a state in which the bypass passage 24 is opened), the pressure in the casing 20 does not decrease (substantially atmospheric pressure). By detecting a change in the pressure inside the casing 20 when the pump 60 is operated, it is possible to detect (diagnose) a malfunction of the canister 500 (e.g. occurrence of leakage or failure of the electric-operated valve 26). Details of a method of detecting a malfunction of the canister 500 will be described later.

In the canister 500, the first activated carbon 18 may be disposed between the second partition wall 530 and the side wall of the casing 20 without providing a gap between the second partition wall 530 and the side wall of the casing 20, an opening may be formed in the casing 20 below the first activated carbon 18, and the pipe 62 may be connected to the opening formed in the casing 20. Specifically, in the canister 500 of FIG. 5, the second partition wall 530 may be the side wall of the casing, and the pipe 62 having the bypass passage 24 therein formed and including the electric-operated valve 26 may be fixed to the casing such that the pipe 62 connects the openings 530a and 532a.

Sixth Embodiment

Figure 6:
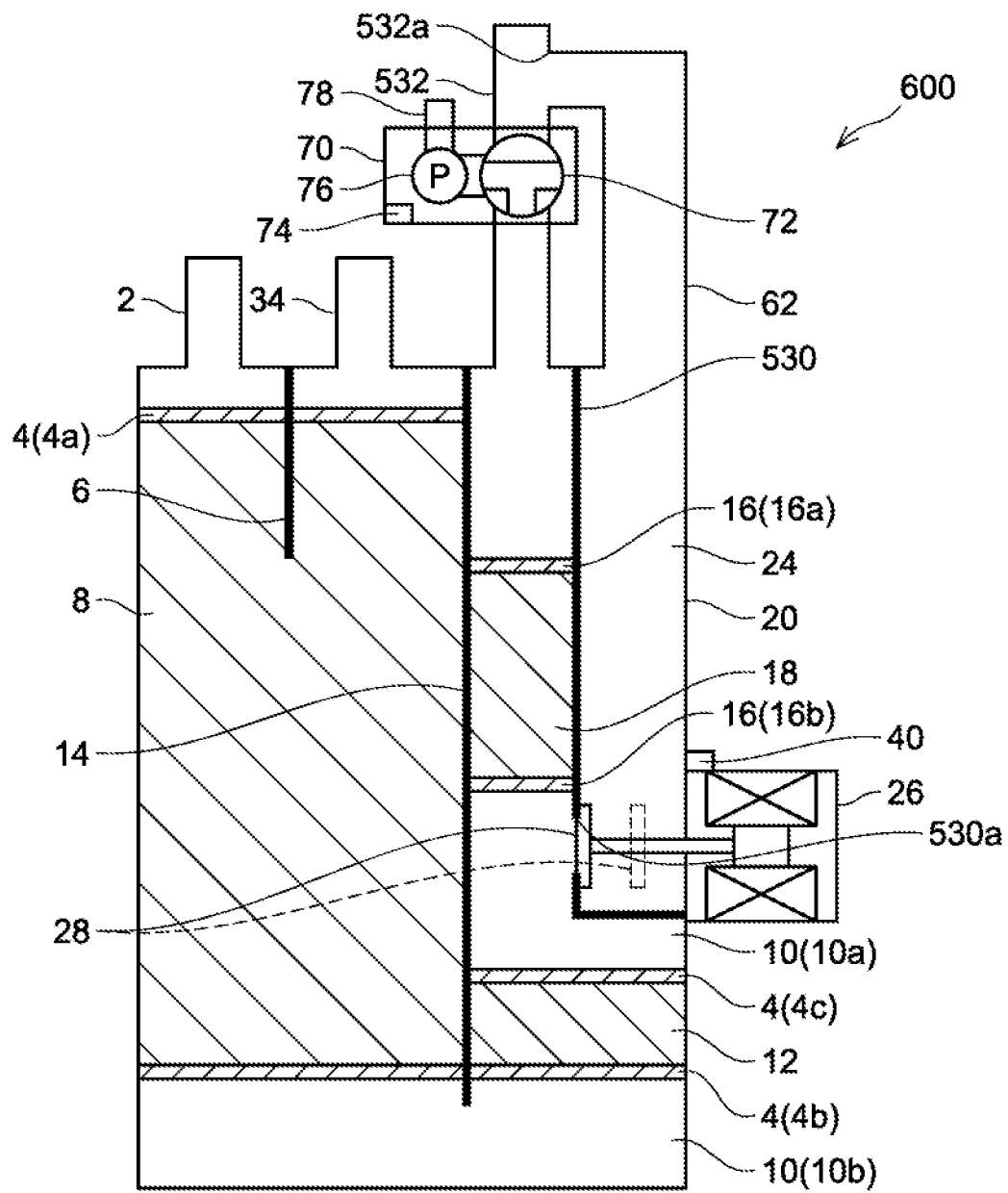
FIG. 6 shows a cross-sectional view of a variation of the canister of the sixth embodiment.

A canister 600 shown in FIG. 6 is identical to the canister 500 except that a pump module 70 is connected to an intermediate point of the atmospheric port 532. The pump module 70 comprises a pump 76, a flow path switching valve 72, and a pressure sensor 74. The pump module 70 is an example of a failure detector. The pump 76 is connected to the atmospheric port 532 via the flow path switching valve 72. Therefore, a discharge port 78 of the pump 76 is provided separately from the atmospheric port 532. The flow path switching valve 72 is configured to switch between a state in which the inside and the outside of the casing 20 are communicated via the pump 76 (discharge port 78) (state shown in FIG. 6) and a state in which the inside and the outside of the casing 20 are communicated without an intervention of the pump 76 (a state in which the flow path switching valve 72 is rotated counterclockwise by 90 degrees from the state in FIG. 6). The pressure sensor 74 is configured to detect the pressure in the casing 20. The pump module 70 may be referred to as a failure detection module configured to detect a malfunction of the canister 600 (e.g. occurrence of leakage or a failure of the electric-operated valve 26).

By using the pump module 70, air is introduced into the casing 20 without passing through the pump 76 when failure detection of the canister 600 is not performed (when the purge gas is supplied to the internal combustion engine). Therefore, it is possible to prevent the flow path resistance of the canister from increasing due to the pump 76 at the time of purging. In the canister 600, similarly to the canister 500, the second partition wall 530 may be the side wall of the casing, and the pipe 62 including the pump module 70 and the electric-operated valve 26 may be fixed to the casing such that the pipe 62 connects the atmospheric port 532 and the opening 530a. That is, a unit (failure detection unit) configured to detect a failure of the canister 600 may be separate from the canister body (casing).

(Control of Canister at Purge Execution)

Figure 7:
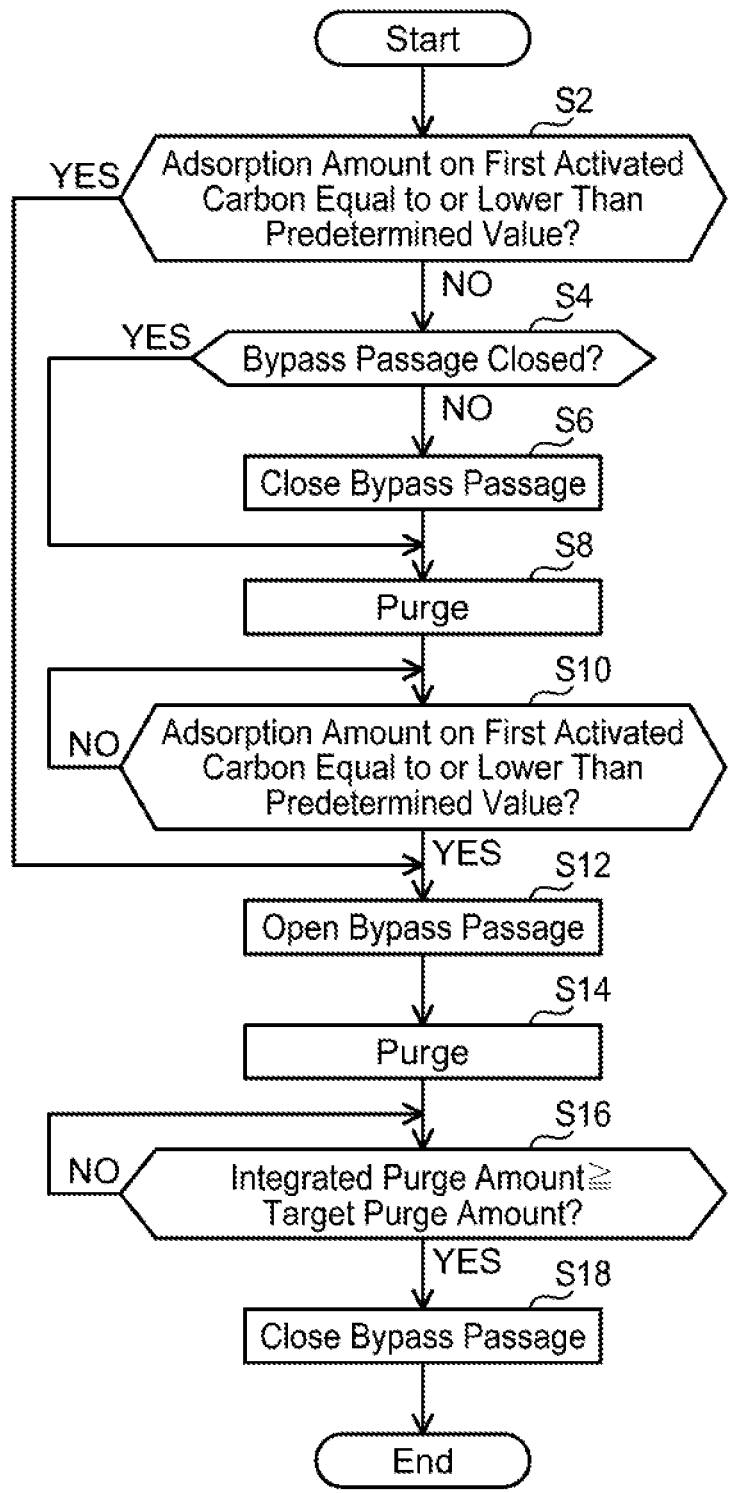
FIG. 7 shows a flow chart relating to flow path control in a canister at time of purge execution.

Referring to FIG. 7, the control of the canister at the time of purge execution will be described. Specifically, a method of controlling the electric-operated valve at the time of purge execution will be described. In the following description, the canister 100 shown in FIG. 1 will be referred to. However, the following control can be executed in all of the canisters 100 to 600.

First, based on a detected value of the sensor 40, it is determined whether or not the adsorption amount (adsorption rate) of the evaporated fuel on the first activated carbon 18 is equal to or less than a predetermined value (step S2). When the adsorption amount of the evaporated fuel exceeds the predetermined value (step S2:NO), that is, when the evaporated fuel is adsorbed on the first activated carbon 18, the process proceeds to step S4, and it is determined whether or not the bypass passage 24 is closed. When the bypass passage 24 is open (step S4:NO), the bypass passage 24 is closed (step S6), and purging is started (step S8). When the bypass passage 24 is closed in step S4 (step S4: YES), the process proceeds to step S8 and purging is started. When the purging is started, the evaporated fuel adsorbed on the first activated carbon 18 is desorbed from the first activated carbon 18, and the amount of adsorbed evaporated fuel on the first activated carbon 18 decreases. As described above, in a normal state (when the electric-operated valve 26 is not operated), the valve body 28 closes the opening 30a and the bypass passage 24 is closed.

Next, based on the detected value of the sensor 40, it is determined whether or not the adsorption amount (adsorption rate) of the evaporated fuel on the first activated carbon 18 becomes equal to or less than the predetermined value (step S10). In a case where the adsorption amount of the evaporated fuel becomes equal to or less than the predetermined value (step S10: YES), the bypass passage 24 is opened (step S12), and the purging is continued (step S14). In a case where the adsorption amount of the evaporated fuel exceeds the predetermined value (step S10:NO), the detection of the adsorption amount of the evaporated fuel (capacitance of the first activated carbon 18) is repeated. In a case where the adsorption amount of the evaporated fuel on the first activated carbon 18 is equal to or less than the predetermined value when the purging is started (step S2: YES), the bypass passage 24 is opened (step S12), and the purging is started (step S14). In consideration of a detection error of the sensor 40, the "predetermined value" is set to the detected value of the sensor 40 when the evaporated fuel is not adsorbed on the first activated carbon 18.

Thereafter, in a case where an integrated amount of the purge gas supplied to the internal combustion engine becomes equal to or more than a target (required) purge amount (step S16: YES), the bypass passage 24 is closed (step S18), and the purging is terminated. In a case where the integrated amount of the purge gas supplied to the internal combustion engine is less than the target (required) purge amount (step S16: NO), the purging is continued until the integrated amount of the purge gas becomes equal to or more than the target (required) purge amount. The integrated amount of the purge gas can be calculated from the flow rate, concentration, and purge duration of the purge gas.

(Control of Canister at Time of Refueling)

Figure 8:
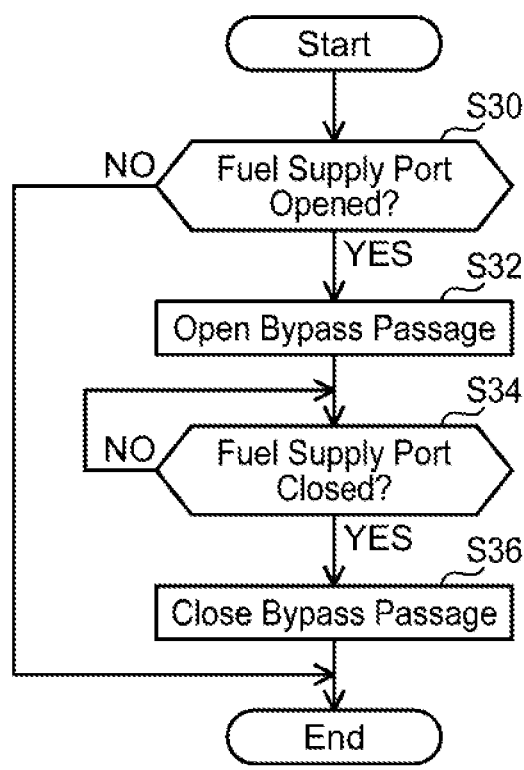
FIG. 8 shows a flow chart relating to the flow path control in the canister at time of refueling.

With reference to FIG. 8, the control of the canister during purging also will be described with reference to the canister 100 (FIG. 1). Refueling is performed in a state where the vehicle is stopped (typically the internal combustion engine is stopped). Therefore, the purging is not performed during the refueling, and the control described below and the control at purge execution described above are not performed concurrently. The control described below can also be executed in all of the canisters 100 to 600.

First, it is detected whether or not a refueling port is open (step S30). If the refueling port is not opened (step S30: NO), the refueling is not performed, and thus the process ends. In a case where the refueling port is open (step S30: YES), the bypass passage 24 is opened (step S32). Due to this, refueling can be performed in a state in which the bypass passage 24 is in conducted state, that is, in a state in which the flow path resistance in the canister 100 is small.

Next, it is detected whether or not the refueling port is closed (step S34). In a case where the refueling port is closed (step S34: YES), the bypass passage 24 is closed (step S36), and the process ends. In a case where the refueling port is not closed (step S34:NO), the state of the refueling port is continuously detected until the refueling port is closed. As described above, the bypass passage 24 is closed normally (when the electric-operated valve 26 is not operated), and is opened when the electric-operated valve 26 is operated. Therefore, the above processing can be referred to as processing of operating the electric-operated valve 26 and switching the flow path in the canister 100 to a low-resistance flow path (bypass passage 24) while the refueling is performed (while the refueling port is opened). Further, the open/closed state of the refueling port can be detected by a sensor attached to the refueling port or a lid that closes the refueling port.

(Control of Detecting Failure in Canister)

Figure 9:
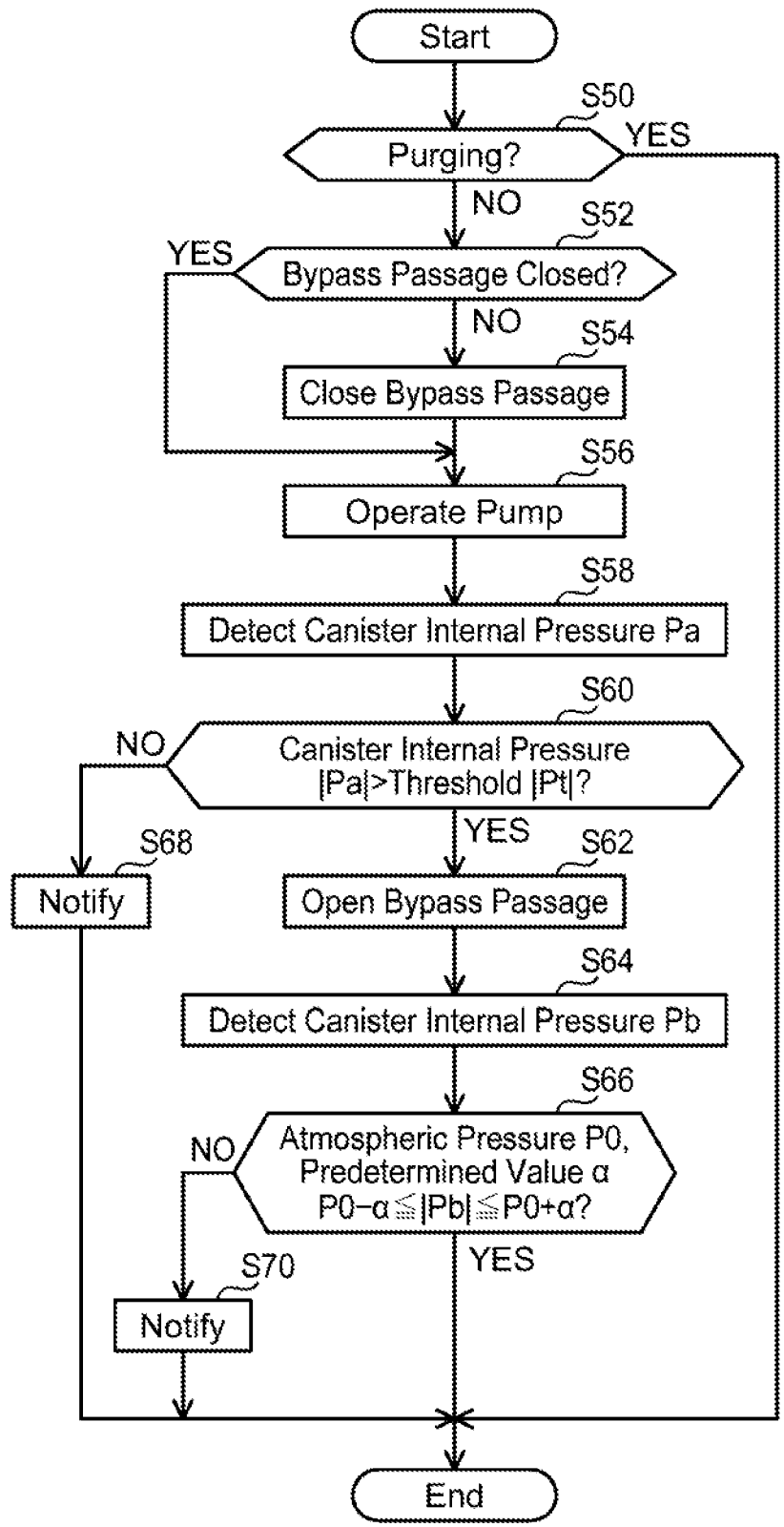
FIG. 9 shows a flow chart relating to the flow path control in the canister at time of failure detection.

With reference to FIG. 9, a description will be made as to a control when detecting a failure of the canister (diagnosing presence/absence of failure). In the following description, the canister 500 shown in FIG. 5 will be referred to. The following control can be performed in the aforementioned canisters 500 and 600.

The failure detection of the canister is performed while the purging is not performed. Therefore, first, it is determined whether or not the purging is being performed (step S50). In a case where the purging is being performed (step S50: YES), the process ends. In a case where the purging is not being performed (step S50:NO), when the bypass passage 24 is open (step S52:NO), the pump 60 is operated (step S56) after the bypass passage 24 is closed (step S54). When the bypass passage 24 is closed in step S52 (step S52: YES), the pump 60 is operated as it is (step S56). Normally (when the electric-operated valve 26 is not operated), the valve body 28 closes the opening 530a and the bypass passage 24 is closed.

Next, a pressure Pa in the canister 500 is detected (step S58). The pressure Pa can be detected by arranging a pressure gauge (not shown) in the casing 20 or the atmospheric port 532. When the pump 60 is operated, the pressure Pa becomes a negative pressure if there is no malfunction occurring in the canister 500 (e.g. leakage or failure of the electric-operated valve 26). On the other hand, in a case where a malfunction is occurring in the canister 500, the pressure Pa becomes the atmospheric pressure or a magnitude of a negative pressure becomes smaller than the magnitude of a negative pressure when the canister 500 is in a normal state. For example, when a leakage is occurring in the canister 500, the pressure Pa does not sufficiently decrease. Similarly, also when the electric-operated valve 26 (the valve body 28) is not closing the opening 530a, the pressure Pa does not sufficiently decrease.

Next, a magnitude (absolute value) of the detected pressure Pa is compared with a magnitude (absolute value) of a threshold Pt (step S60). The threshold value Pt is set in accordance with properties of the pump 60 and based on the pressure obtained when the pump 60 is operated in a state in which no malfunction is occurring in the canister 500. Therefore, in the case where no malfunction is occurring in the canister 500, the pressure |Pa| becomes larger than the threshold value |Pt|. On the other hand, in a case where malfunction is occurring in the canister 500, the pressure |Pa| becomes equal to or less than the threshold |Pt|. In a case where the pressure |Pa| is equal to or less than the threshold |Pt| (step S60:NO), an abnormality is notified (step S68), and the failure detection is terminated. The notification of the abnormality is performed, for example, by lighting a failure indication lamp (MIL.).

In a case where the pressure |Pa| is larger than the threshold |Pt| (step S60: YES), the electric-operated valve 26 is operated to open the bypass passage 24 (step S62), and a pressure Pb in the canister 500 is detected (step S64). Thereafter, the detected pressure Pb is compared with an atmospheric pressure P0 (step S66). If the electric-operated valve 26 normally operates (opens the bypass passage 24) and the bypass passage 24 is not clogged, that is, when the bypass passage 24 is conductive, the pressure Pb in the canister 500 becomes substantially the atmospheric pressure. However, if an abnormality is occurring in the electric-operated valve 26 and the opening 530a is not opened or if the bypass passage 24 is clogged, the pressure Pb in the canister 500 remains at a negative pressure. Therefore, in the case where the bypass passage 24 is conductive, the pressure Pb satisfies "P0−α≤Pb≤P0+α". On the other hand, in a case where the bypass passage 24 is not conductive (when a malfunction is occurring in the electric-operated valve 26 and the bypass passage 24), "P0−α≤Pb≤P0+α" is not satisfied. Therefore, in the case where "P0−α≤Pb≤P0+α" is not satisfied (step S66:NO), the abnormality is notified (step S70), and the failure detection is terminated. In the case where "P0−α≤Pb≤P0+α" is satisfied (step S66: YES), it is determined that an abnormality is not occurring in the canister 500, and the failure detection is terminated.

Other Embodiments

The above embodiments describe a configuration where the bypass passage is closed when the electric-operated valve is not operated, and the bypass passage is opened when the electric-operated valve is operated. However, the bypass passage may be opened when the electric-operated valve is not operated, and the bypass passage may be opened when the electric-operated valve is operated. That is, operations of the electric-operated valve can be appropriately changed as long as the opening and closing of the bypass passage are switchable. Further, as the electric-operated valve, a stepping motor type valve can be implemented for example instead of the solenoid valve.

In addition, the above embodiments describe a configuration which uses a sensor configured to detect the capacitance of the first activated carbon to detect the amount of the evaporated fuel adsorbed on the first activated carbon. However, as a sensor configured to detect the amount of the evaporated fuel adsorbed on the first activated carbon, a sensor of a type capable of detecting the adsorption amount of evaporated fuel, such as a temperature type, an ultrasonic type, an optical type, a pressure type, an oxygen concentration detection type, for example, can be used.

Further, in the above fifth and sixth embodiments and the descriptions in Control of Detecting Failure in Canister, an example which uses the pump configured to suction the inside of the canister is described. However, the pump may be arranged to pump air into the canister and to provide a positive pressure within the canister. Even in this case, by comparing the absolute value of the pressure Pa with the absolute value of the threshold value Pt in step S60 of FIG. 9, leakage of the canister and/or malfunction of the electric-operated valve can be detected.

Further, an on-off valve may be provided in the atmospheric port as the failure detector of the canister, instead of a device (means) configured to forcibly change the pressure in the canister, such as the pump 60 (the fifth embodiment) and the pump module 70 (the sixth embodiment). In this case, normally (when failure detection of the canister is not performed), the on-off valve is opened, and when the vehicle stops, the on-off valve is closed for a predetermined period of time, and a change in pressure in the canister is detected, by which failure detection (diagnosis of the presence or absence of failure) of the canister can be performed. Typically, the fuel tank is arranged in vicinity of the exhaust pipe of the internal combustion engine. Therefore, when the vehicle stops, the temperature of the environment in which the fuel tank is disposed changes. When the vehicle is stopped and the on-off valve is closed, the pressure in the canister including the fuel tank changes in accordance with the change in temperature so long as no malfunction is occurring in the canister. However, if a malfunction is occurring in the canister, the pressure in the canister does not change in accordance with the change in temperature. Thus, by detecting a change in pressure in the canister in a stale in which the canister is tight-sealed (state in which the on-off valve is closed), it is possible to detect a failure of the canister.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A canister for an evaporated fuel processing device, the canister comprising:
    a casing including an atmospheric port, a tank port, and a purge port;
    a first adsorbent housed in the casing and facing the atmospheric port;
    a second adsorbent housed in the casing, facing the tank port and the purge port, and separated from the first adsorbent by a space;
    a second passage communicating the atmospheric port and the space and bypassing a first passage which extends from the atmospheric port through the first adsorbent to the space; and
    a switching valve configured to switch between opening and closing of the second passage.

2. The canister according to claim 1, further comprising a failure detector connected to the atmospheric port, wherein
the second passage bypasses the first passage and the failure detector.

3. The canister according to claim 2, further comprising a third adsorbent disposed at a position in the space that is away from the first adsorbent and the second adsorbent,
wherein the second passage communicates with the space between the first adsorbent and the third adsorbent.

4. The canister according to claim 3, further comprising a sensor configured to detect a state of the first adsorbent, wherein
the switching valve switches between opening and closing of the second passage based on a detected value of the sensor.

5. The canister according to claim 1, further comprising a third adsorbent disposed at a position in the space that is away from the first adsorbent and the second adsorbent,
wherein the second passage communicates with the space between the first adsorbent and the third adsorbent.

6. The canister according to claim 1, further comprising a sensor configured to detect a state of the first adsorbent, wherein
the switching valve switches between opening and closing of the second passage based on a detected value of the sensor.

* * * * *